(12) United States Patent
Ohsie et al.

(10) Patent No.: US 10,382,202 B1
(45) Date of Patent: Aug. 13, 2019

(54) METHOD AND APPARATUS FOR FEDERATED IDENTITY AND AUTHENTICATION SERVICES

(71) Applicant: EMC IP Holding Company LLC, Hopkinton, MA (US)

(72) Inventors: David Ohsie, Baltimore, MD (US); Ram Viswanathan, Kirkland, WA (US); John P. Field, Chatham, NJ (US); Matthew Troutman, Houston, TX (US); Rossen P. Dimitrov, Nashua, NH (US); Paul T. Burke, Mendon, MA (US); Mark A. O'Connell, Westborough, MA (US); Chuanjun Wang, Andover, MA (US); Prashant J. Dongale, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 441 days.

(21) Appl. No.: 13/631,055

(22) Filed: Sep. 28, 2012

(51) Int. Cl.
*H04L 9/32* (2006.01)
*H04L 29/06* (2006.01)

(52) U.S. Cl.
CPC ........ *H04L 9/3213* (2013.01); *H04L 63/0807* (2013.01)

(58) Field of Classification Search
CPC .................. H04L 9/3213; H04L 63/0807
See application file for complete search history.

(56) References Cited

U.S. PATENT DOCUMENTS

| | | | |
|---|---|---|---|
| 6,339,423 B1* | 1/2002 | Sampson et al. | 715/854 |
| 8,510,818 B2* | 8/2013 | Garg et al. | 726/9 |
| 2007/0107048 A1* | 5/2007 | Halls et al. | 726/4 |
| 2007/0234417 A1* | 10/2007 | Blakley, III et al. | 726/12 |
| 2010/0115594 A1* | 5/2010 | Paya et al. | 726/5 |
| 2012/0275597 A1* | 11/2012 | Knox et al. | 380/210 |
| 2013/0036034 A1* | 2/2013 | Karon et al. | 705/31 |
| 2013/0138957 A1* | 5/2013 | Dharmarajan et al. | 713/168 |

* cited by examiner

*Primary Examiner* — Mohammed Waliullah
(74) *Attorney, Agent, or Firm* — Ryan, Mason & Lewis, LLP

(57) ABSTRACT

Example embodiments of the present invention provide a method, an apparatus, and a computer program product for authenticating a request from a first domain to access a resource in a second domain according to credentials in the first domain. The method includes receiving, from the first domain, an assertion in the second domain and generating, according to the assertion, a token configured to be redeemed by a client in the first domain to access the resource in the second domain. The token then may be provided to the first domain.

21 Claims, 6 Drawing Sheets

METHOD AND APPARATUS FOR FEDERATED IDENTITY AND AUTHENTICATION SERVICES

CROSS REFERENCE TO RELATED APPLICATIONS

This Application is related to U.S. patent application Ser. No. 13/630,455 entitled "SINGLE CONTROL PATH" Ser. No. 13/631,030 entitled "METHOD AND APPARATUS FOR FEDERATING A PLURALITY OF ONE BIG ARRAYS" Ser. No. 13/631,039 entitled "METHOD AND APPARATUS FOR AUTOMATED INFORMATION LIFE-CYCLE MANAGEMENT USING A FEDERATION OF ARRAYS" Ser. No. 13/631,190 entitled "METHOD, APPARATUS, AND SYSTEM FOR MANAGING DATA STORAGE WITH AN APPLICATION PROGRAMMING INTERFACE," and now issued as U.S. Pat. No. 10,157,124, Ser. No. 13/631,214 entitled "AUTOMATED POLICY BASED SCHEDULING AND PLACEMENT OF STORAGE RESOURCES," and now issued as U.S. Pat. No. 9,417,997, and Ser. No. 13/631,246 entitled "DISTRIBUTED SYSTEM SOFTWARE INFRASTRUCTURE," and now issued as U.S. Pat. No. 9,841,929, filed on even date herewith, the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligence and communications electronics and software for making the data on the disks available. To leverage the value of MSS, these are typically networked in some fashion.

Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols.

Each network type has its advantages and disadvantages, but SANs are particularly noted for providing the advantage of being reliable, maintainable, and being a scalable infrastructure, but their complexity and disparate nature make them difficult to centrally manage. Thus, a problem encountered in the implementation of SANs is that the dispersion of resources tends to create an unwieldy and complicated data storage environment. Reducing the complexity by allowing unified management of the environment instead of treating it as a disparate entity would be an advancement in the data storage computer-related arts. While it is an advantage to distribute intelligence over various networks, it should be balanced against the need for unified and centralized management that can grow or scale proportionally with the growth of what is being managed. This is becoming increasingly important as the amount of information being handled and stored grows geometrically over short time periods and such environments add new applications, servers, and networks also at a rapid pace.

SUMMARY

Example embodiments of the present invention provide a method, an apparatus, and a computer program product for authenticating a request from a first domain to access a resource in a second domain according to credentials in the first domain. The method includes receiving, from the first domain, an assertion in the second domain and generating, according to the assertion, a token configured to be redeemed by a client in the first domain to access the resource in the second domain. The token then may be provided to the first domain.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Traditional public cloud services, such as public clouds like Amazon® Web Services, Microsoft® Windows® Azure™, EMC® Atmos®, have a particular approach to managing users in which all users are inside the system and are provided the right level of access to resources within that public cloud. In order to implement a hybrid cloud, seamless integration with enterprise is needed to provide security and access rights (e.g., active directory groups, single sign on) so that whatever login the user uses within the enterprise works with the cloud. However, service providers cannot access directory servers in an enterprise domain. Although a client in the enterprise domain could provide its password to the service provider, the service provider does not have visibility into the enterprise domain to validate the password (and it is unfavorable for service providers to store such password because of security risks).

Further, an independent identity provider could be used to validate user credentials and return a token to the client to log in to the service. However, validation of a token requires the independent identity provider to cross the enterprise firewall. If the independent identity provider exists in the service provider domain, it cannot validate user credentials with the enterprise directory because it cannot cross the enterprise firewall to reach the enterprise directory; if the independent identity provider exists in the enterprise domain, the service provider cannot validate the token received by the service provider from the client because the service provider cannot cross the enterprise firewall to reach the independent identity provider.

Figure 1:
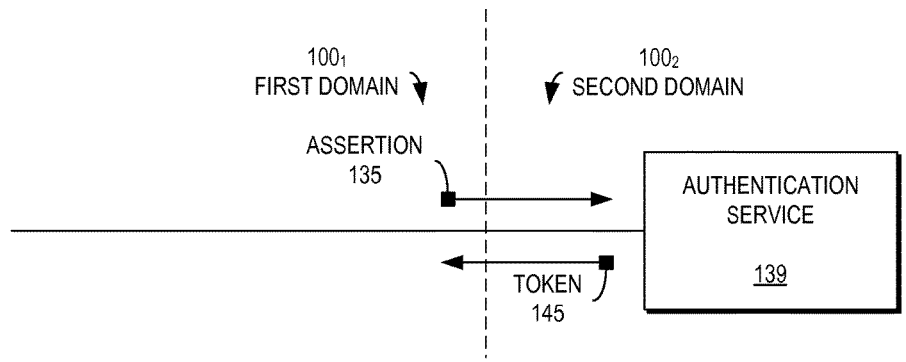
FIG. 1 is a block diagram illustrating providing a token to a first domain, the token generated according to an assertion received from the first domain in a second domain and configured to be redeemed by a client in the first domain to access a resource in the second domain, according to an example embodiment of the present invention.

FIG. 1 is a block diagram illustrating providing a token 145 to a first domain $100_1$, the token 145 generated according to an assertion 135 received from the first domain $100_1$ in a second domain $100_2$ and configured to be redeemed by a client (e.g., client 205 of FIG. 2) in the first domain $100_1$ to access a resource (e.g., resource 275 of FIG. 2) in the second domain $100_2$, according to an example embodiment of the present invention. As illustrated in FIG. 1, an authentication service 139 in the second domain $100_2$ may receive an assertion 135 from the first domain $100_1$, generate a token 145, and provide the token 145 to the first domain $100_1$.

Accordingly, example embodiments of the present invention may provide authentication and single sign on capabilities for services associated with a one big array that do not require enterprises to maintain their user IDs or user attributes in the service. One big array may be comprised of heterogeneous storage resources and may enable multiple types of data services through a single control path. A data service may be a service providing for how data is stored, received and processed. In certain embodiments, data services provide the high-level data and storage management capabilities of the system. A control path may be a way to establish and control access to the data. One big array is described in greater detail in U.S. patent application Ser. No. 13/630,455 entitled "SINGLE CONTROL PATH", filed on even date herewith, the contents and teachings of which are incorporated herein by reference in their entirety.

Figure 2:
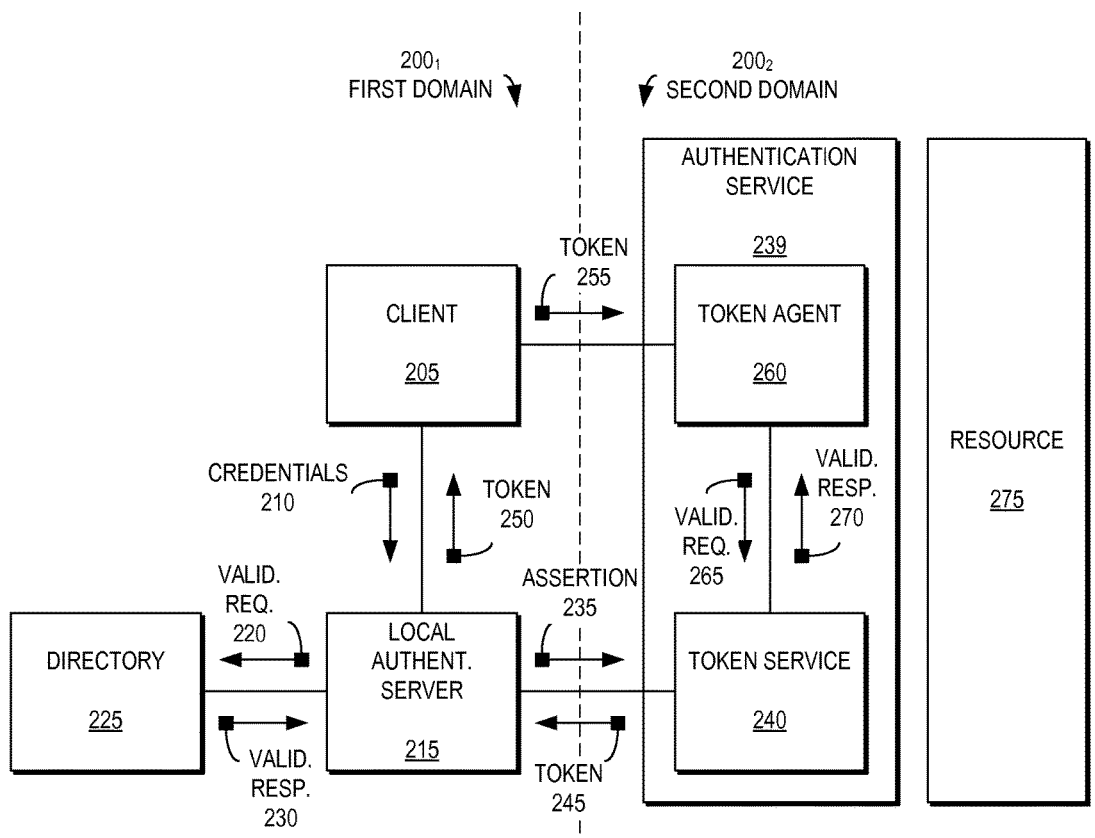
FIG. 2 is a block diagram illustrating providing access to a resource in a second domain according to an indication of a token by a client, wherein the assertion is received from an authentication server in the first domain in a trusted communication and the token is provided to the authentication server, according to an example embodiment of the present invention.
Figure 3:
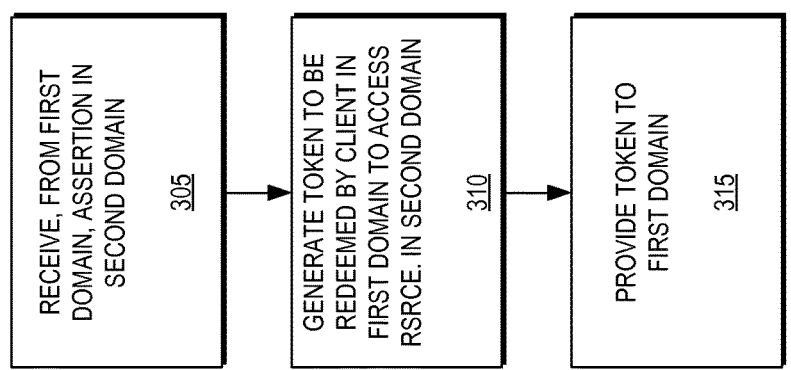
FIG. 3 is a flow diagram illustrating a method providing a token to a first domain, the token generated according to an assertion received from the first domain in a second domain and configured to be redeemed by a client in the first domain to access a resource in the second domain, according to an example embodiment of the present invention.

FIG. 2 is a block diagram illustrating providing access to a resource 275 in a second domain $200_2$ according to an indication of a token 255 by a client 205, wherein the assertion 235 is received from an authentication server 215 in the first domain $200_1$ in a trusted communication and the token 245 is provided to the authentication server 215, according to an example embodiment of the present invention. FIG. 3 is a flow diagram illustrating a method for providing a token to a first domain, the token generated according to an assertion 235 received from the first domain $200_1$ in a second domain $200_2$ and configured to be redeemed by a client 205 in the first domain $200_1$ to access a resource 275 in the second domain $200_2$, according to an example embodiment of the present invention. FIGS. 2 and 3 may be studied in conjunction.

As illustrated in FIG. 2, there is a first domain $200_1$ (e.g., an enterprise domain) and a second domain $200_2$ (e.g., a service provider domain, such as a hybrid cloud service provider). The enterprise domain $200_1$ may include a plurality of users (not shown) that have roles as determined by the enterprise. Identities for these users, as well as their assigned roles, may be included in an identity provider in the first domain $200_1$, such as a directory 225. The directory 225 may be an Active Directory or any other identity provider, such as those conforming to Lightweight Directory Access Protocol (LDAP), X.509 certificates, or SPNEGO.

In order to provide access to resources 275 in the second domain $200_2$, in certain embodiments these user roles need to be made available to an authentication service 239 in the second domain $200_2$. However, it is beneficial for service providers to not store such user credentials as they can pose a potential security liability. Accordingly, example embodiments of the present invention map roles of the users in the first domain $200_1$, as determined from the directory 225, to roles for the service provided in the second domain $200_2$. Therefore, as users are added or removed from the directory 225, such as LDAP, the service in the second domain $200_2$ does not need to be aware of such changes. Such a mapping of roles may be performed by an administrator in the first domain $200_1$.

A user (not shown) in the first domain $200_1$ may request, via a client 205, access to a resource 275 in the second domain $200_2$. The client 205 may send the user's credentials 210 to a local authentication server 215 in the first domain $200_1$. The local authentication server 215 may act as an agent in the enterprise domain $200_1$, having connectivity into the enterprise directory 225. The local authentication server 215 may, in response, send a request 220 to a directory 225 in the first domain $200_1$ to validate the user's credentials 210. The directory 225 then may return a validation response 230 to the local authentication server 215 in the first domain $200_1$ indicative of whether the user's credentials 210 are valid. In certain embodiments, the validation response 230 may include a list of user attributes (e.g., user's principle name, list of user groups).

If the user's credentials 210 are valid according to the validation response 230 from the directory 225, the local authentication server 215 in the first domain $200_1$ may generate an assertion 235 following validation of the identity of the user and provide the assertion 235 to a token service 240 in the second domain $200_2$. The assertion 235 may be received from the local authentication server 215 in the first domain $200_1$ in a trusted communication (e.g., handshake, SSL, certificate, SAML token, transport layer trusted communication). Accordingly, the token service 240 may receive, from the first domain $200_1$, the assertion 235 in the second domain $200_2$ (305). The assertion 235 may include only those user groups (i.e., a subset) relevant to the service in the second domain $200_2$, which may be determined by an administrator in the first domain $200_1$.

The token service 240 then may generate, according to the assertion 235, a token 245 configured to be redeemed by the client 205 in the first domain $200_1$ to access the resource 275 in the second domain $200_2$ (310). The token service 240 then may provide the token 245 to the first domain $200_1$ (315). This token 245 is redeemable/verifiable by the service provider because it is issued by the token service 240 in the service provider domain $200_2$. In a preferred embodiment, the token service 240 may provide the token 245 to the local authentication server 215 in the first domain $200_1$ over the same trusted communication channel over which the assertion 235 was sent. Accordingly, the local authentication server 215 may receive the token 245 in the first domain $200_1$ from the token service 240 in the second domain $200_2$. The local authentication server 215 then may provide the token 250 to the client 205 for redemption.

The client 205 then may provide an indication of the token 255 to a token agent 260 in the second domain $200_2$. As described in greater detail below with respect to FIGS. 4 and 5, the indication of the token 255 may include the token 255, itself, a management request including the token (e.g., request including token 555 of FIG. 5), or an encrypted management request signed using the token (e.g., cryptographic request 455 of FIG. 4).

Figure 6:
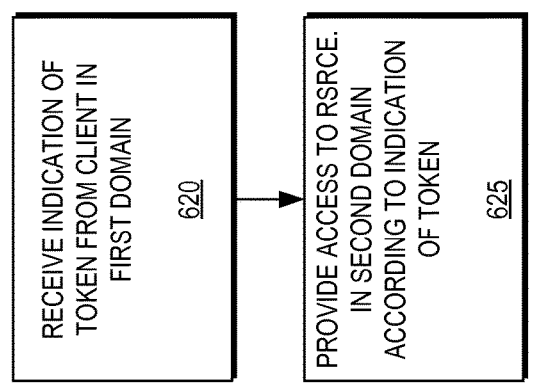
FIG. 6 is a flow diagram illustrating a method for providing access to a resource in a second domain according to an indication of a token received from a client in a first domain, according to an example embodiment of the present invention.

FIG. 2 also may be studied in conjunction with FIG. 6, which is a flow diagram illustrating a method for providing access to a resource 275 in a second domain $200_2$ according to an indication of a token 255 received from a client 205 in a first domain $200_1$, according to an example embodiment of the present invention. Accordingly, the token agent 260 may receive the indication of the token 255 from the client 205 in the first domain $200_1$ (620) and provide access to the resource 275 in the second domain $200_2$ according to the indication of the token 255 (625). In certain embodiments, the authentication service 239 may establish an authenticated communication channel with the client, thereby eliminating the need to provide an indication of the token 255 with every request from the client 205. In some embodiments, the token 255 may be a one-time use token used to establish a session or a communication channel which may be considered an authenticated communication channel. In other embodiments, the token 255 may have a longer lifetime and could be used for additional calls, in which case the client 205 may store the token 250 and, potentially, redeem it multiple times 255. As described below with respect to FIG. 4, in some embodiments the client may never send the token 255 but rather may store it and use it to sign management requests sent to the second domain $200_2$.

Figure 7:
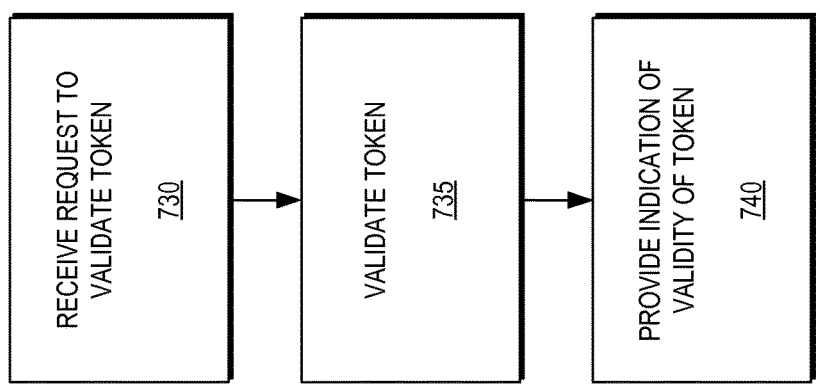
FIG. 7 is a flow diagram illustrating a method for validating a token, according to an example embodiment of the present invention.

FIG. 2 also may be studied in conjunction with FIG. 7, which is a flow diagram illustrating a method for validating a token 255, according to an example embodiment of the present invention. In certain embodiments, validation of the token 255 in validation request 265 is optional; however, it should be noted that the token service 240 in the second domain $200_2$ may retain a copy of the token 245 for verification purposes. The token agent 260 in the second domain $200_2$ may receive a request to redeem the token 255 from a client 205 in the first domain $200_1$ and initiate a request to validate the token 255. The token agent 260 then may validate the indication of the token 255 with the token service 240 in the second domain $200_2$ that issued the token 245 to the local authentication server 215 in the first domain $200_1$. Accordingly, the token service 240 may receive a request 265 from the token agent 260 in the second domain $200_2$ to validate the token 255 (730) and validate the token 255 (735). The token service 240 may provide a validation response 270 to the token agent 260 in the second domain $200_2$ providing an indication of the validity of the token 255 (740). The validation response 270 may provide an indication of the validity of the token 255 for conditional access by the client 205 in the first domain $200_1$ to the resource 275 in the second domain $200_2$. The token agent 260 then may provide the client 205 access to the resource 275 in the second domain $200_2$ if the token 255 is valid.

Figure 4:
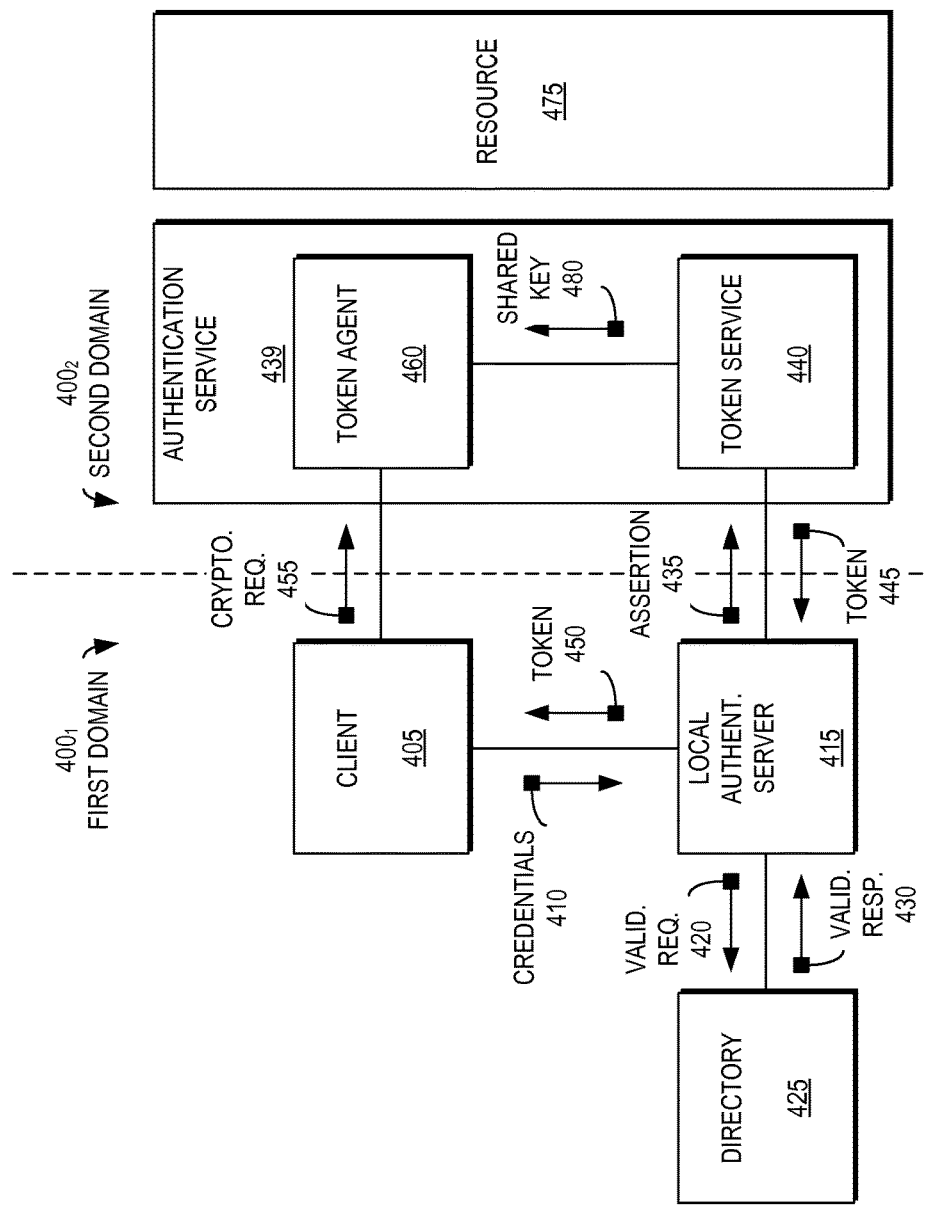
FIG. 4 is a block diagram illustrating providing access to a resource according to an indication of a token by a client cryptographically encoded in a request, according to an example embodiment of the present invention.

FIG. 4 is a block diagram illustrating providing access to a resource 475 according to an indication of a token 455 by a client 405 cryptographically encoded in a request, according to an example embodiment of the present invention. As illustrated in FIG. 4, and similar to the description above with respect to FIG. 2, a client 405 may provide credentials 410 to a local authentication server 415 which may authenticate the credentials 410 via a validation request 420 to a directory 425 and a validation response 430 from the directory 425. If the credentials 410 are valid, the local authentication server 415 may make an assertion 435 to the token service 440 which generates a token and returns the token 445 to the local authentication server 415 which, in turn, provides the token 450 to the client 405 for redemption.

The client then may provide the token to the token agent 460 for redemption. Accordingly, the token agent 460 may receive an indication of the token 455 from the client 405 in the first domain $400_1$ (620). As illustrated in FIG. 4, the indication of the token may be a cryptographically encoded request 455 signed using the token 450. In the authentication service 439, the token agent 460 then may decrypt the encoded request 455 signed using the token 450 via a shared key 480 provided by the token service 440. The token agent 460 then may provide access to the resource 475 in the second domain $400_2$ according to the indication of the token 455 (625).

Figure 5:
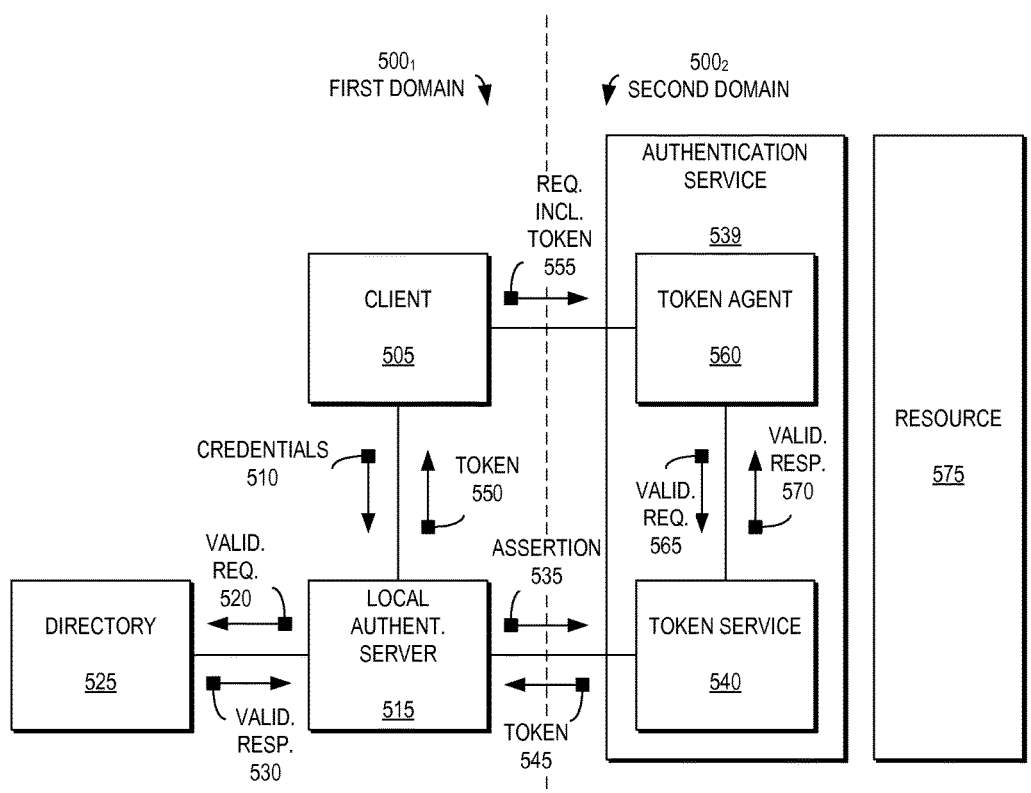
FIG. 5 is a block diagram illustrating providing access to a resource according to an indication of a token by a client included in a request, according to an example embodiment of the present invention.

FIG. 5 is a block diagram illustrating providing access to a resource 575 according to an indication of a token 555 by a client 505 included in a request 555, according to an example embodiment of the present invention. As illustrated in FIG. 5, and similar to the description above with respect to FIG. 2, a client 505 may provide credentials 510 to a local authentication server 515 which may authenticate the credentials 510 via a validation request 520 to a directory 525 and a validation response 530 from the directory 525. If the credentials 510 are valid, the local authentication server 515 may make an assertion 535 to the token service 540 which generates a token and returns the token 545 to the local authentication server 515 which, in turn, provides the token 550 to the client 505 for redemption.

The client 505 then may provide the token to the token agent 560 for redemption. Accordingly, the token agent 560 may receive an indication of the token 555 from the client 505 in the first domain 500₁ (620). As illustrated in FIG. 5, the indication of the token may be a request that includes the token 555. In the authentication service 539, the token agent 560 then may extract the token 550 and validate the token 550 via a validation request 565 to the token service 540 that generated the token 545 and a validation response 570 from the token service 540. The token agent 560 then may provide access to the resource 575 in the second domain 500₂ according to the indication of the token 555 (625).

Figure 8:
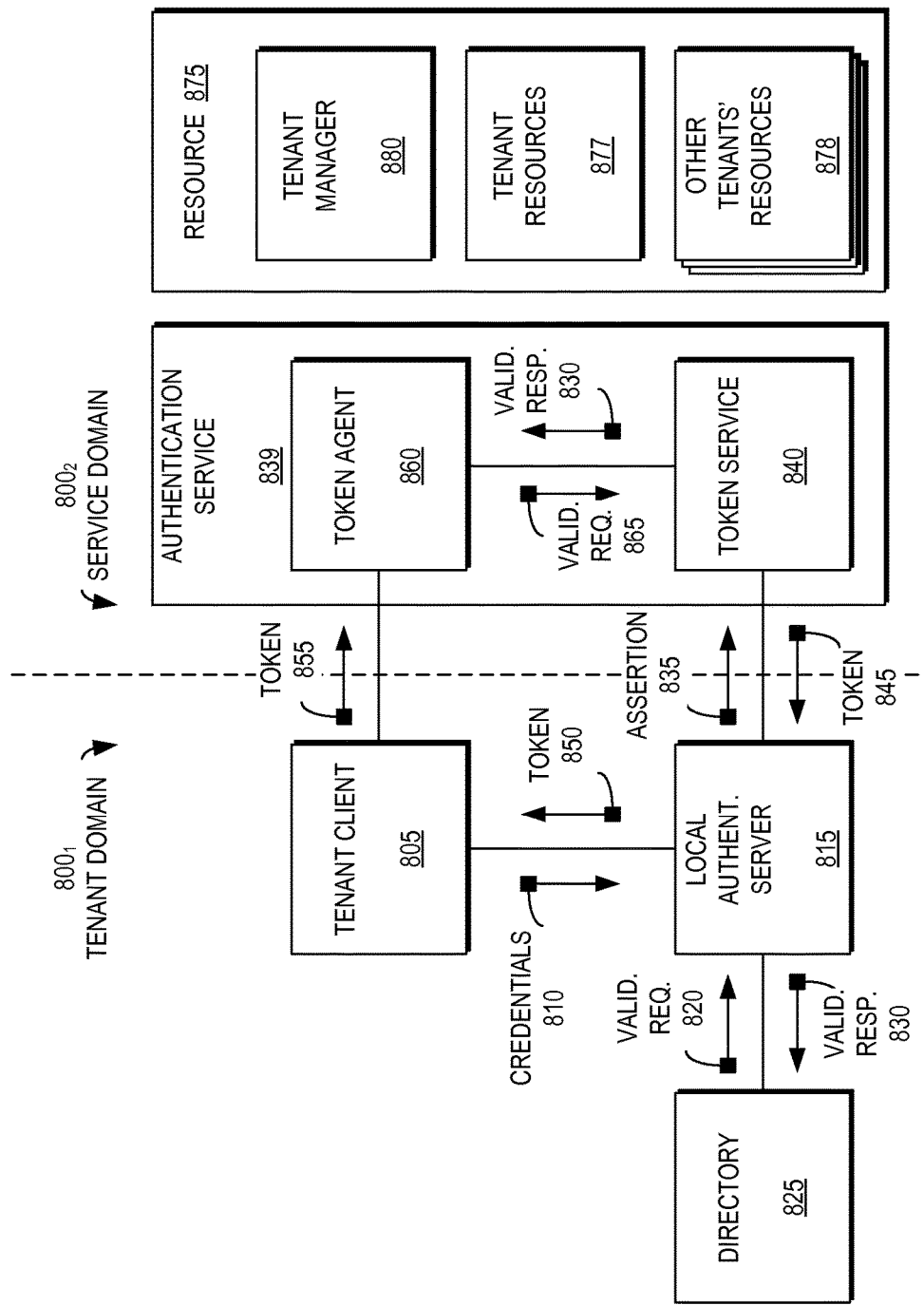
FIG. 8 is a block diagram illustrating providing access to a resource in a second domain associated with a tenant according to an indication of a token by a client, wherein the token includes attributes of the client identifying the tenant, according to an example embodiment of the present invention.

FIG. 8 is a block diagram illustrating providing access to a resource 875 in a second domain 800₂ associated with a tenant 877 according to an indication of a token 855 by a tenant client 805, wherein the token 855 includes attributes of the tenant client 805 identifying the tenant domain 800₁. Multi-tenancy is a useful concept within both enterprises and service providers. Enterprises may use multi-tenancy to partition their resources among cost centers and meter usage separately; service providers may sell resources to different organizations. FIG. 8 includes elements 810, 815, 820, 825, 830, 835, 839, 840, 845, 850, 860, and 865, which operate in a manner similar to respective corresponding elements 510, 515, 520, 525, 530, 535, 539, 540, 545, 550, 560, and 565 previously described in connection with FIG. 5.

In a preferred embodiment, each authenticated user is assigned one or more roles when they establish a session to a zone. A role may map to a set of API calls appropriate for its responsibilities. In certain embodiments, there may be the following roles in the authorization scheme as illustrated in Table 1 below:

TABLE 1

| Role | Authorized Actions |
| --- | --- |
| System Admin | May manage the zone's system resources (e.g., storage arrays, pools, transport zones, and other things not managed by Tenants). Only subjects in the zone's identity provider may be assigned this role. |
| System Monitor | Read-only version of System Admin. Intended for layered monitoring applications. Only subjects in the zone's identity provider may be assigned this role. |
| Security Admin | May manage the zone's security token service configuration for identity federation with tenant identity providers. May assign roles for the zone and for tenants. Only subjects in the zone's identity provider may be assigned this role. |
| Tenant Admin | May create and delete sub-tenants and projects in their tenant. May set owner and access control list privileges for projects. May assign roles for the tenant and its sub-tenants. May manage resources in the tenant's projects. |
| Project Admin | May create projects in their tenant. |

Role assignments may be managed on a per-zone basis by the Security Admin using a role assignment API which defines the assignment rules in terms of expressions over attributes from the user's security token. A Tenant Admin may assign the Tenant Admin and Project Admin roles in the context of his/her Tenant or Sub-Tenants.

In certain embodiments, the following attributes of the user's security token in Table 2 may be used in assignment rules:

TABLE 2

| Attribute | Description |
| --- | --- |
| subject-id | A single-valued attribute indicating the user name of the user (e.g., user@domain.com) |
| group | A multi-valued attribute indicating the groups to which this user is a member (e.g., admins, lab-managers) |
| sts | A single-valued attribute indicating the security token service that created the user's security token (e.g., domain.com) |

The owner of a Project may be the user who created it, and is granted full rights to manage its resources. In some cases, it may be desirable to delegate Project privileges to others. Accordingly, a Privilege Assignment API may be provided to allow the owner to grant privileges for a Project. Privilege assignments may be managed through an Access Control List (ACL) associated with the Project. As with role assignments above, privilege assignments may be specified in terms of expressions over attributes from the user's security token. In certain embodiments, there may be the following groupings of privileges in Table 3 defined in the authorization scheme:

TABLE 3

| Project Privileges | Authorized Actions |
| --- | --- |
| all | May fully manage the lifecycle of storage resources in the Project (e.g., volumes, fileshares, key pools). |
| backup | May take snapshots and perform other read-only operations (e.g., list resources, etc.). |
| use | May use (via data path) resources in the Project. |

In a preferred embodiment, a newly created Project may have an empty ACL and it may be up to the owner to manage the ACL appropriately post-creation.

Access control lists may be used for those elements that, in certain embodiments, require fine-grained access control as shown in Table 4:

TABLE 4

| Resource | Privileges | Principal rationale for ACL |
| --- | --- | --- |
| Class of service | Use | Control which tenants may use a CoS. Supports use cases of providing special CoS to select tenants (e.g., those that are "premium" tenants). |
| Remote zone | Use | Control which tenants may use a remote zone. Allows a higher-order management app to configure proper visibility of remote zones to tenants in a manner consistent with the provisioning of tenants to zones. |
| Neighborhood | Use | Control which tenants (or groups within an enterprise) may use a neighborhood. Allows the provider to create "private" neighborhoods for use by "premium" tenants or groups. |

In a preferred embodiment, a newly created resource may have an empty ACL and it may be up to the System Admin to manage the ACL appropriately post-creation.

As illustrated in FIG. 8, resources 875 may be shared by a multitude of different tenants who don't have a view into each other's use of resources (e.g., tenant resources 877, other tenants' resources 878). In certain embodiments, tenancy may be a hierarchical concept in which a tenant may create sub-tenants, which may create further layers of sub-tenants. Resources 875 may be partitioned between tenants and, in certain embodiments, tenants are not able to view or be aware of another tenant using the same resources. In a preferred embodiment, tenant administrators can only manage resources that are within their tenancies and, by default, a parent tenant admin cannot access resources held by child tenants unless explicitly added to the Tenant Admin role.

A Tenant Manager 880 may maintain a directory with the relationships of tenants and sub-tenants. The directory may be represented by a tree structure. It should be understood that, in a preferred embodiment, a tenant may have only one parent and may have zero or any number of sub-tenants. A Root Tenant may be at the top of the hierarchy. The Root Tenant may be created by a SysAdmin. In a preferred embodiment, a SysAdmin manages the physical storage. Additionally, the SysAdmin may manage the pool of storage which is used for object storage (i.e., physical storage used for objects is shared across all tenants). When provisioning storage for objects, the SysAdmin may place tags on the various elements. These tags may then be used in policies to control object placement, as well as being used to restrict policy creation when creating tenants and sub-tenants. Specifically, physical segregation of object data between tenants can be achieved by using these tags and restricting various tenants to place objects only within disjoint subsets of the storage provisioned for objects.

In a preferred embodiment, the Root Tenant will not have any users, resources, or classes of service associated with it; rather, its only purpose is to create a consistent, self-referencing architecture. Root Tenant's sub-tenants, may be referred to as Top Level Tenants and may be actual Tenant Organizations with full fledged services and capabilities. A Top Level Tenant may be a form of sub-tenant, though there may be a few restrictions to ensure that the configuration will be valid. Otherwise, the settings for the Top Level Tenant may be the same as for the sub-tenant.

When a tenant creates a sub-tenant, various options and permissions may be set to control what the sub-tenant can do:

Boolean: Can the sub-tenant establish new policies? If false, then the sub-tenant can only use policies that have been established by the tenant and assigned to the sub-tenant. If true, then the tenant may push policies to the sub-tenant, and the sub-tenant may either use these policies or may create additional custom policies.

Boolean: Inherit tenant policies. In certain embodiments, the sub-tenant may see the tenant's policies and utilize them. Additional policies created by the tenant may be visible immediately and usable by the sub-tenant. This leads to a recursive model, especially as the sub-tenant can further pass on the policies, so a new policy created by a tenant may be immediately visible to a sub-tenant N levels deep in the recursion.

Boolean: Can create new sub-tenants. Allows the sub-tenant to establish additional sub-tenants. If false, then the sub-tenant can provision applications only. In certain embodiments, only the first level tenants can create sub-tenants; second level tenants cannot.

Boolean: Can provision block and/or file. Allows the sub-tenant to provision block devices and/or file shares. In certain embodiments, the tenant may have the right to provision N TB of block or file storage. When creating a sub-tenant, the tenant may choose to dedicate a portion of this N TB to the sub-tenant or to share this allocation with the sub-tenant. If using the sharing, a tenant with the right to provision 100 TB of block storage could choose to share the entire allocation of 100 TB across all sub-tenants—then the total allocation across the sub-tenants cannot exceed 100 TB. This model is flexible, but would complicate the ability to quickly determine if an allocation is allowable. In other embodiments, when a tenant has the ability to provision N TB of block or file storage, only allow dedicated allocations for sub-tenants. If the tenant can provision 100 TB and creates four sub-tenants, the tenant would assign the right to provision to the four sub-tenants, but the total provisioning assigned to the tenants could not exceed 100 TB. If the tenant assigns 20 TB provisioning rights to each of the four sub-tenants, each sub-tenant can only provision a limited amount, and if the tenant wishes to create additional sub-tenants, then it cannot assign more than 20 TB of additional provisioning rights. As when a sub-tenant wishes to provision storage, it only needs to check its provisioning limit against what it has provisioned.

Boolean: Can create objects. Gives the sub-tenant the right to access object storage (i.e., the sub-tenant can create an application which can access the object store). Given that the object store may typically be a shared resource across tenants/sub-tenants, provisioning of the space for the object store may be done at another level, such as the SysAdmin level. In certain embodiments, a quota limit at the tenant level covers all sub-tenants recursively. Quotas assigned to sub-tenants may be more restrictive than the tenant limit if desired. This makes the quota limit checking complicated, as the actual quota limit which ultimately may deny a request to store an object may be from any of multiple levels, depending on the overall pattern of object storage usage and quota limits assigned across the hierarchy. In certain embodiments, quotas may be assigned only at the sub-tenant level and not at the level of the top level tenant. The sub-tenant also may assign quotas to individual applications, so the actual quota limit enforced for an application may be the overall sub-tenant quota or the individual application quota, whichever is reached first.

Further, in certain embodiments, there may be a way for the tenant to control what kinds of storage that the sub-tenant can utilize. This may manifest slightly differently for the different classes of storage:

Block/file: the sub-tenant may be assigned a defined set of pools from which it can provision.

Object: the sub-tenant may be assigned a list of object pools which can be used when creating policies. These pools may be created by the SysAdmin and may incorporate various characteristics about the underlying storage, including zone information.

Moreover, in certain embodiments, there may be knowledge regarding the zones that may be used when provisioning storage so that the tenant may establish, for example, replication policies and have a degree of control for remote replication and data recovery protection.

Additionally, in other embodiments, knowledge of available services in provisioning, such as compression, deduplication, and spin-down. This information may be part of the storage pool. For example, the list of services may include: compression (available for Celerra® filesystems and Atmos® cloud systems from EMC Corporation of Hopkinton, Mass.), deduplication (available for Celerra® filesystems, CLARiiON® arrays from EMC Corporation of Hopkinton, Mass., and Atmos® cloud systems), thin provisioning (available for Celerra® filesystems and CLARiiON® arrays), and spin-down (available for CLARiiON® arrays and Atmos® cloud systems).

In a preferred embodiment, each sub-tenant should have an overall point of contact (e.g., email, name) and a list of rights about what SNMP traps and/or alerts it can see.

Boolean: Create new administrator(s). In certain embodiments, this controls whether or not the sub-tenant administrator can create additional sub-tenant administrator roles. If the sub-tenant admin has the rights to create additional sub-tenant administrators, the sub-tenant admin may also restrict the capabilities of those administrators.

Figure 9:
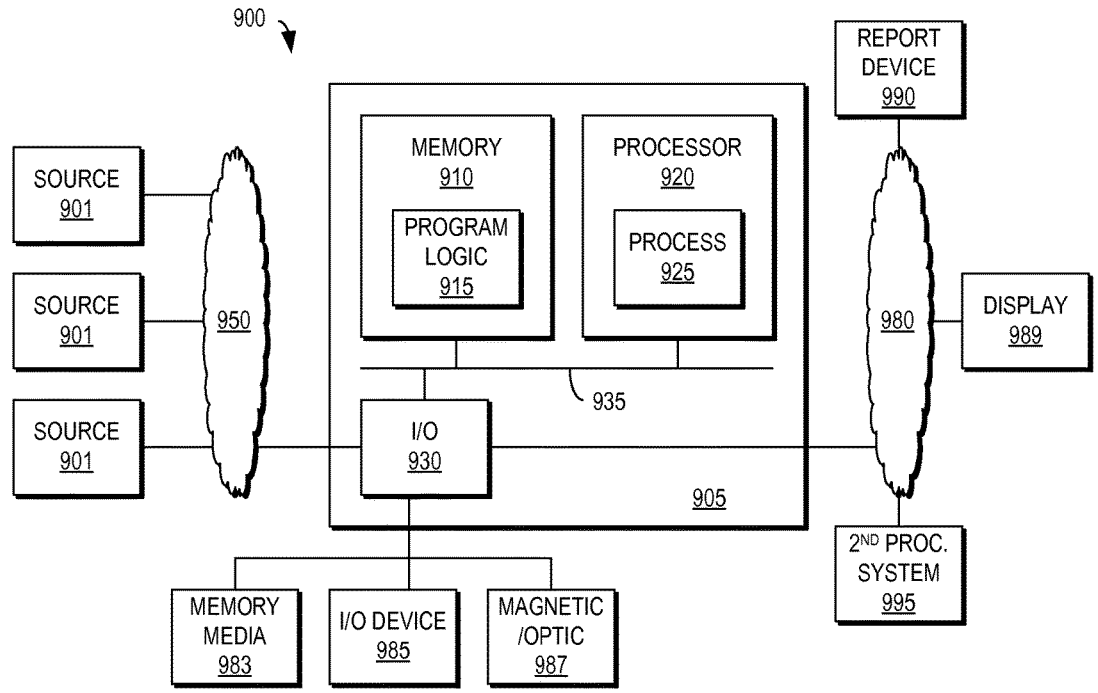
FIG. 9 is a block diagram illustrating an apparatus according to an example embodiment of the present invention.

FIG. 9 is a block diagram of an example embodiment apparatus 905 according to the present invention. The apparatus 905 may be part of a system 900 and includes memory 910 storing program logic 915, a processor 920 for executing a process 925, and a communications I/O interface 930, connected via a bus 935. The communications I/O interface 930 provides connectivity to memory media 983, I/O device 985, and drives 987, such as magnetic or optical drives. The apparatus 905 is configured to communicate with a plurality of sources 901 via a network 950 using the communications I/O interface 930. The apparatus 905 is further configured to communicate with a display 989, a report device 990, and a second processing system 995 via a network 980 using the communications I/O interface 930.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 10:
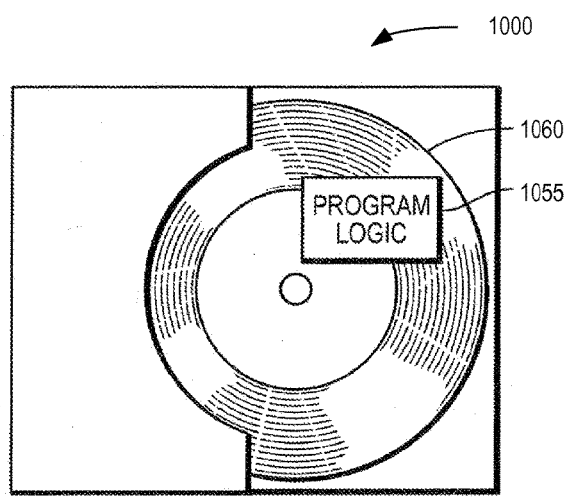
FIG. 10 is an illustration of an apparatus as embodied in program code according to an example embodiment of the present invention.

FIG. 10 shows program logic 1055 embodied on a computer-readable medium 1060 as shown, and wherein the logic 1055 is encoded in computer-executable code configured for carrying out the gas controlling process of this invention, thereby forming a computer program product 1000.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

The invention claimed is:

1. A method comprising:
   receiving, from an authentication server in a first domain, an assertion at an authentication service in a second domain, the assertion generated by the authentication server in the first domain according to a validated request from a client in the first domain, wherein the authentication server residing in the first domain generates the assertion in response to receiving credentials from the client;
   generating, at the authentication service in the second domain according to the assertion received from the first domain, a token configured to be redeemed by the client in the first domain to the authentication service for authentication by the authentication service in the second domain of the client in the first domain to enable the client in the first domain to access a resource in the second domain; and
   providing the token from the authentication service in the second domain to the authentication server in the first domain for provision to the client in the first domain and subsequent redemption by the client in the first domain to the authentication service for authentication by the authentication service in the second domain of the client in the first domain to enable the client in the first domain to access the resource in the second domain;
   wherein the first domain is associated with an enterprise system;
   wherein the second domain is associated with a multi-tenant cloud computing system; and
   wherein the token comprises a set of attributes of a tenant client in the multi-tenant cloud computing system, the set of attributes comprising one or more privilege assignments for utilizing (i) one or more portions of an object storage pool managed by a system administrator tenant and (ii) one or more additional storage pools from which the tenant client is permitted to provision block and file storage.

2. The method of claim 1 further comprising:
   receiving an indication of the token from the client in the first domain; and
   providing access to the resource in the second domain according to the indication of the token.

3. The method of claim 2 wherein receiving an indication of the token from the client in the first domain comprises receiving a request to access the resource in the second domain cryptographically signed using the token, the method further comprising decrypting the request according to a shared key to access the resource in the second domain.

4. The method of claim 2 wherein receiving an indication of the token from the client in the first domain comprises receiving a request, including the token, to access the resource in the second domain, the method further comprising extracting the token from the request.

5. The method of claim 2 wherein providing access to the resource in the second domain according to the token comprises establishing an authenticated communication channel with the client.

6. The method of claim 1 wherein the multi-tenant cloud computing system comprises a plurality of tenants arranged in a tenant hierarchy comprising two or more levels, a given tenant at an upper level in the tenant hierarchy being configured to create one or more sub-tenants at one or more lower levels in the tenant hierarchy and to manage privilege assignments for the one or more sub-tenants at the one or more lower levels in the tenant hierarchy.

7. The method of claim 6 wherein the tenant client comprises a root tenant of the tenant hierarchy, the root tenant being configured to manage physical storage of the multi-tenant cloud computing system providing the object storage pool by placing tags on various elements in the object storage pool with the tags being utilized in one or more policies to control object placement in the object storage pool and to control policy creation when creating the one or more sub-tenants in the one or more lower levels of the tenant hierarchy.

8. The method of claim 7 wherein the root tenant is further configured to enforce physical segregation of object data in the object storage pool between two or more of the sub-tenants in the one or more lower levels of the tenant hierarchy utilizing the tags.

9. The method of claim 6 wherein the tenant client comprises the given tenant, the given tenant creating a given sub-tenant at a given one of the lower levels of the tenant hierarchy by setting a set of permissions for the given sub-tenant.

10. The method of claim 9 wherein setting the set of permissions for the given sub-tenant comprises:
selecting whether the given sub-tenant is configured to establish new policies;
selecting whether the given sub-tenant inherits existing policies of the given tenant; and
selecting whether the given sub-tenant is permitted to create additional sub-tenants.

11. The method of claim 9 wherein setting the set of permissions for the given sub-tenant comprises selecting whether the given sub-tenant is configured to provision one or more block storage devices and file shares.

12. The method of claim 11 wherein selecting whether the given sub-tenant is configured to provision one or more block storage devices and file shares comprises delegating a right to provision at least a portion of a storage pool assigned to the given tenant to the given sub-tenant.

13. The method of claim 9 wherein setting the set of permissions for the given sub-tenant comprises selecting whether the given sub-tenant has permission to create objects in the object storage pool.

14. An apparatus comprising:
a processor; and
memory storing instructions that, when executed on the processor, cause the apparatus to:
receive, from an authentication server in a first domain, an assertion at an authentication service in a second domain, the assertion generated by the authentication server in the first domain according to a validated request from a client in the first domain, wherein the authentication server residing in the first domain generates the assertion in response to receiving credentials from the client;
generate, at the authentication service in the second domain according to the assertion received from the first domain, a token configured to be redeemed by the client in the first domain to the authentication service for authentication by the authentication service in the second domain of the client in the first domain to enable the client in the first domain to access a resource in the second domain; and
provide the token from the authentication service in the second domain to the authentication server in the first domain for provision to the client in the first domain and subsequent redemption by the client in the first domain to the authentication service for authentication by the authentication service in the second domain of the client in the first domain to enable the client in the first domain to access the resource in the second domain;
wherein the first domain is associated with an enterprise system;
wherein the second domain is associated with a multi-tenant cloud computing system; and
wherein the token comprises a set of attributes of a tenant client in the multi-tenant cloud computing system, the set of attributes comprising one or more privilege assignments for utilizing (i) one or more portions of an object storage pool managed by a system administrator tenant and (ii) one or more additional storage pools from which the tenant client is permitted to provision block and file storage.

15. The apparatus of claim 14 further comprising:
receiving an indication of the token from the client in the first domain; and
providing access to the resource in the second domain according to the indication of the token.

16. The apparatus of claim 15 wherein receiving an indication of the token from the client in the first domain comprises receiving a request to access the resource in the second domain cryptographically signed using the token, the method further comprising decrypting the request according to a shared key to access the resource in the second domain.

17. The apparatus of claim 15 wherein receiving an indication of the token from the client in the first domain comprises receiving a request, including the token, to access the resource in the second domain, the method further comprising extracting the token from the request.

18. The apparatus of claim 15 wherein providing access to the resource in the second domain according to the token comprises establishing an authenticated communication channel with the client.

19. The apparatus of claim 14 wherein the multi-tenant cloud computing system comprises a plurality of tenants arranged in a tenant hierarchy comprising two or more levels, a given tenant at an upper level in the tenant hierarchy being configured to create one or more sub-tenants at one or more lower levels in the tenant hierarchy and to manage privilege assignments for the one or more sub-tenants at the one or more lower levels in the tenant hierarchy.

20. A computer program product including anon-transitory computer-readable storage medium encoded with computer program code that, when executed on a processor of a computer, causes the computer to authenticate a request from a first domain to access a resource in a second domain according to credentials in the first domain, the computer program product comprising:
computer program code for receiving, from an authentication server in a first domain, an assertion at an authentication service in a second domain, the assertion generated by the authentication server in the first domain according to a validated request from a client in the first domain, wherein the authentication server residing in the first domain generates the assertion in response to receiving credentials from the client;
computer program code for generating, at the authentication service in the second domain according to the assertion received from the first domain, a token configured to be redeemed by the client in the first domain to the authentication service for authentication by the authentication service in the second domain of the client in the first domain to enable the client in the first domain to access a resource in the second domain; and
computer program code for providing the token from the authentication service in the second domain to the authentication server in the first domain for provision to the client in the first domain and subsequent redemption by the client in the first domain to the authentication service for authentication by the authentication service in the second domain of the client in the first domain to enable the client in the first domain to access the resource in the second domain;
wherein the first domain is associated with an enterprise system;

wherein the second domain is associated with a multi-tenant cloud computing system; and wherein the token comprises a set of attributes of a tenant client in the multi-tenant cloud computing system, the set of attributes comprising one or more privilege assignments for utilizing (i) one or more portions of an object storage pool managed by a system administrator tenant and (ii) one or more additional storage pools from which the tenant client is permitted to provision block and file storage.

21. The computer program product of claim 20 wherein the multi-tenant cloud computing system comprises a plurality of tenants arranged in a tenant hierarchy comprising two or more levels, a given tenant at an upper level in the tenant hierarchy being configured to create one or more sub-tenants at one or more lower levels in the tenant hierarchy and to manage privilege assignments for the one or more sub-tenants at the one or more lower levels in the tenant hierarchy.

\* \* \* \* \*